US011755891B2

(12) United States Patent
Vineyard et al.

(10) Patent No.: US 11,755,891 B2
(45) Date of Patent: Sep. 12, 2023

(54) DEVICES AND METHODS FOR INCREASING THE SPEED OR POWER EFFICIENCY OF A COMPUTER WHEN PERFORMING MACHINE LEARNING USING SPIKING NEURAL NETWORKS

(71) Applicant: National Technology & Engineering Solutions of Sandia, LLC, Albuquerque, NM (US)

(72) Inventors: Craig Michael Vineyard, Cedar Crest, NM (US); William Mark Severa, Albuquerque, NM (US); James Bradley Aimone, Albuquerque, NM (US); Stephen Joseph Verzi, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1485 days.

(21) Appl. No.: 16/013,810

(22) Filed: Jun. 20, 2018

(65) Prior Publication Data

US 2019/0392301 A1    Dec. 26, 2019

(51) Int. Cl.
*G06N 3/08* (2006.01)
*G06K 9/62* (2022.01)
*G06N 20/00* (2019.01)

(52) U.S. Cl.
CPC ............ *G06N 3/08* (2013.01); *G06K 9/6269* (2013.01); *G06K 9/6276* (2013.01); *G06N 20/00* (2019.01)

(58) Field of Classification Search
CPC ........ G06N 3/08; G06N 20/00; G06K 9/6269; G06K 9/6276
See application file for complete search history.

(56) References Cited

U.S. PATENT DOCUMENTS

2014/0081895 A1*  3/2014  Coenen ................. G06N 3/049
                                                                    706/25
2018/0174023 A1*  6/2018  Imam ...................... G06N 3/08
(Continued)

OTHER PUBLICATIONS

Vineyard et al., "Spiking Neuron Implementations of Several Fundamental Machine Learning Algorithms," International Conference on Neuromorphic Systems (ICONS), Knoxville, Tennessee, USA, 2018, 4 pp.

(Continued)

*Primary Examiner* — Fayyaz Alam
(74) *Attorney, Agent, or Firm* — Yee & Associates P.C.

(57) ABSTRACT

A method for increasing a speed and efficiency of a computer when performing machine learning using spiking neural networks. The method includes computer-implemented operations; that is, operations that are solely executed on a computer. The method includes receiving, in a spiking neural network, a plurality of input values upon which a machine learning algorithm is based. The method also includes correlating, for each input value, a corresponding response speed of a corresponding neuron to a corresponding equivalence relationship between the input value to a corresponding latency of the corresponding neuron. Neurons that trigger faster than other neurons represent close relationships between input values and neuron latencies. Latencies of the neurons represent data points used in performing the machine learning. A plurality of equivalence relationships are formed as a result of correlating. The method includes performing the machine learning using the plurality of equivalence relationships.

20 Claims, 5 Drawing Sheets

(56) References Cited

U.S. PATENT DOCUMENTS

2018/0174041 A1* 6/2018 Imam ............... G06N 3/063
2019/0244079 A1* 8/2019 George ............. G06N 3/063

OTHER PUBLICATIONS

"CM1K, KNN in µS, any Dataset Size," Technical Brief, CogniMem Technologies, Inc., Jun. 2011, pp. 1-4.
Verzi et al., "Optimization Computation with Spiking Neurons," unpublished U.S. Appl. No. 15/837,326, filed Dec. 11, 2017.

* cited by examiner

DEVICES AND METHODS FOR INCREASING THE SPEED OR POWER EFFICIENCY OF A COMPUTER WHEN PERFORMING MACHINE LEARNING USING SPIKING NEURAL NETWORKS

STATEMENT OF GOVERNMENT INTEREST

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates to methods and devices for increasing the speed or power efficiency of a computer when performing machine learning using spiking neural networks.

2. Background

Traditional complementary metal oxide semiconductor (CMOS) based computers employ transistors as their fundamental switching device upon which digital logic gates may be built to execute a breadth of Boolean logic functions. The computations to be performed are typically specified via high level logic descriptions and compiled onto the underlying hardware for execution.

However, CMOS based computers have been undesirably slow when performing certain machine learning algorithms in certain applications. Alternative, or in addition, such computers use an undesirable amount of energy. Energy consumption can cause a computer to heat up to an undesirable degree, reducing performance and possibly damaging delicate circuits.

SUMMARY

The illustrative embodiments provide for a method for increasing the speed and efficiency of a computer when performing machine learning using spiking neural networks. The method includes computer-implemented operations; that is, operations that are solely executed on a computer. The method includes receiving, in a spiking neural network, a plurality of input values upon which a machine learning algorithm is based. The method also includes correlating, for each input value, a corresponding response speed of a corresponding neuron to a corresponding equivalence relationship between the input value to a corresponding latency of the corresponding neuron. Neurons that trigger faster than other neurons represent close relationships between input values and neuron latencies. Latencies of the neurons represent data points used in performing the machine learning. A plurality of equivalence relationships are formed as a result of correlating. The method includes performing the machine learning using the plurality of equivalence relationships.

The illustrative embodiments also contemplate a computer which is configured to execute the above method, such as but not limited to an application specific integrated circuit (ASIC). The illustrative embodiments also contemplate a non-transitory computer readable storage medium storing program code which, when executed by a processor, performs the above computer-implemented method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Overview

Figure 1:
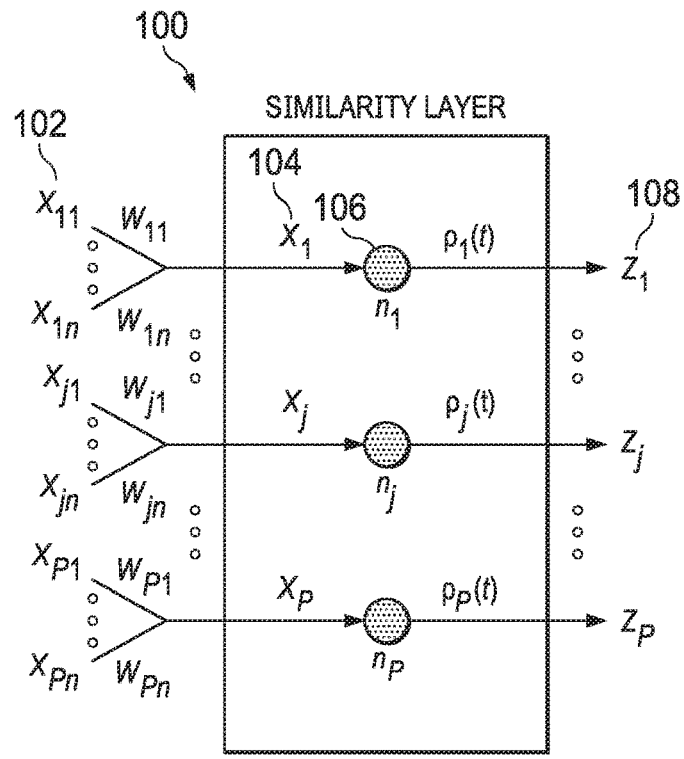
FIG. 1 illustrates a spiking similarity neural circuit, in accordance with an illustrative embodiment.

Spiking neural networks are innately parallel and comprised of event-driven lightweight computational units which in aggregation can compute sophisticated functions. Additionally, spiking neurons operate in a temporal regime offering complexity advantages.

Previously, encoding information in spike timing has shown benefits to optimization-type algorithms. Here, we show that similar approaches can also be used to compute fundamental machine learning algorithms.

Many machine learning algorithms are based upon a similarity or distance computation, and we show that a spiking similarity function is easily implementable in a spiking neural network. Namely, how quickly a neuron is driven to spike is indicative of the similarity between the neuron's input and its response function. We extend and build upon this spiking similarity computation to show how the canonical k-Nearest Neighbor algorithm may be implemented as well as the Adaptive Resonance Theory (ART) online learning classifier and the Support Vector Machine (SVM) statistical classifier.

In many cases neuromorphic hardware is only utilized for the inference portion of a deep neural network leaving the training computation learning process to be performed on costlier hardware. This effort shows how spiking neural computation may be utilized to perform learning as well as inference, and in doing so provides a path towards performing learning computation in low power neuromorphic hardware. The spiking implementation approach may be extended to a spiking neural computation implementation of many other machine learning algorithms.

INTRODUCTION

Traditional CMOS based computers employ transistors as their fundamental switching device upon which digital logic gates may be built to execute a breadth of Boolean logic functions. The computations to be performed are typically specified via high level logic descriptions and compiled onto the underlying hardware for execution. Alternatively, in this work, we show some exemplar machine learning (ML) algorithms for which spiking neurons can be used as the implementation medium to perform the desired computation rather than logic gates.

While this premise by itself is not surprising in the sense that neural networks can perform universal function approximation, an interesting twist to our approach is that spiking neurons are not simply performing universal function approximation to yield the desired computation, but rather an understanding of what the desired computation to be performed is established and then translated into a spiking neuron equivalent.

Spiking Machine Learning Algorithms

In many cases, machine learning algorithms are based upon a distance computation to infer relationships to other data points or relationships to a particular region of space (such as a hyperplane). Typically, these computations are performed using classic approaches on conventional von Neumann hardware while taking into consideration acceleration approaches such as parallelization.

Alternatively, spiking neurons may be used. Core to this approach is a spiking neural similarity computation. We describe this spiking neural circuit next, and then show how we are able to utilize this spiking similarity function to implement some fundamental machine learning algorithms. Namely, we describe how extensions of this basic idea may be used to implement the canonical k-Nearest Neighbor clustering algorithm, the online learning Adaptive Resonance Theory (ART) algorithm, as well as a spiking Support Vector Machine (SVM) algorithm.

FIG. 1 illustrates a spiking similarity neural circuit, in accordance with an illustrative embodiment. Circuit 100, a spiking similarity neural circuit, may be implemented either as software or as an application-specific integrated circuit.

Similarity measures the equivalence relationship between entities based upon some defined parameterization. A spiking neuron is able to compute such a function based upon how well weighted inputs raise its internal potential value driving the neuron to fire if the potential exceeds a threshold. Input values which correspond well with (are similar to) a neurons' response characteristic (defined by the neuron input weights) are able to raise the potential of the neuron faster than inputs which do not.

For example, in visual cortex, center-on cells have a response characteristic in which input stimuli in the center of a neuron's receptive field and the absence of input in the periphery will drive the neuron to fire. Conversely, the inverse would do little to raise the intercellular potential of the neuron and defines a center-off receptive field. The speed upon which the individual neurons spike is then indicative of the similarity of the input to the neuron's defined response characteristic.

FIG. 1 depicts a general neural circuit to implement this spiking-similarity computation. After the initial presentation of input values, $X_{11}$ 102, which are scaled and integrated then a nominal input, $X_1$ 104, is passed to all neurons, $n_1$ 106, driving them to fire. This firing latency is inversely proportional to similarity between the input and the neural response encoding. Note the response function of individual neurons may be specified as desired. The result is output $Z_1$ 108.

Figure 2:
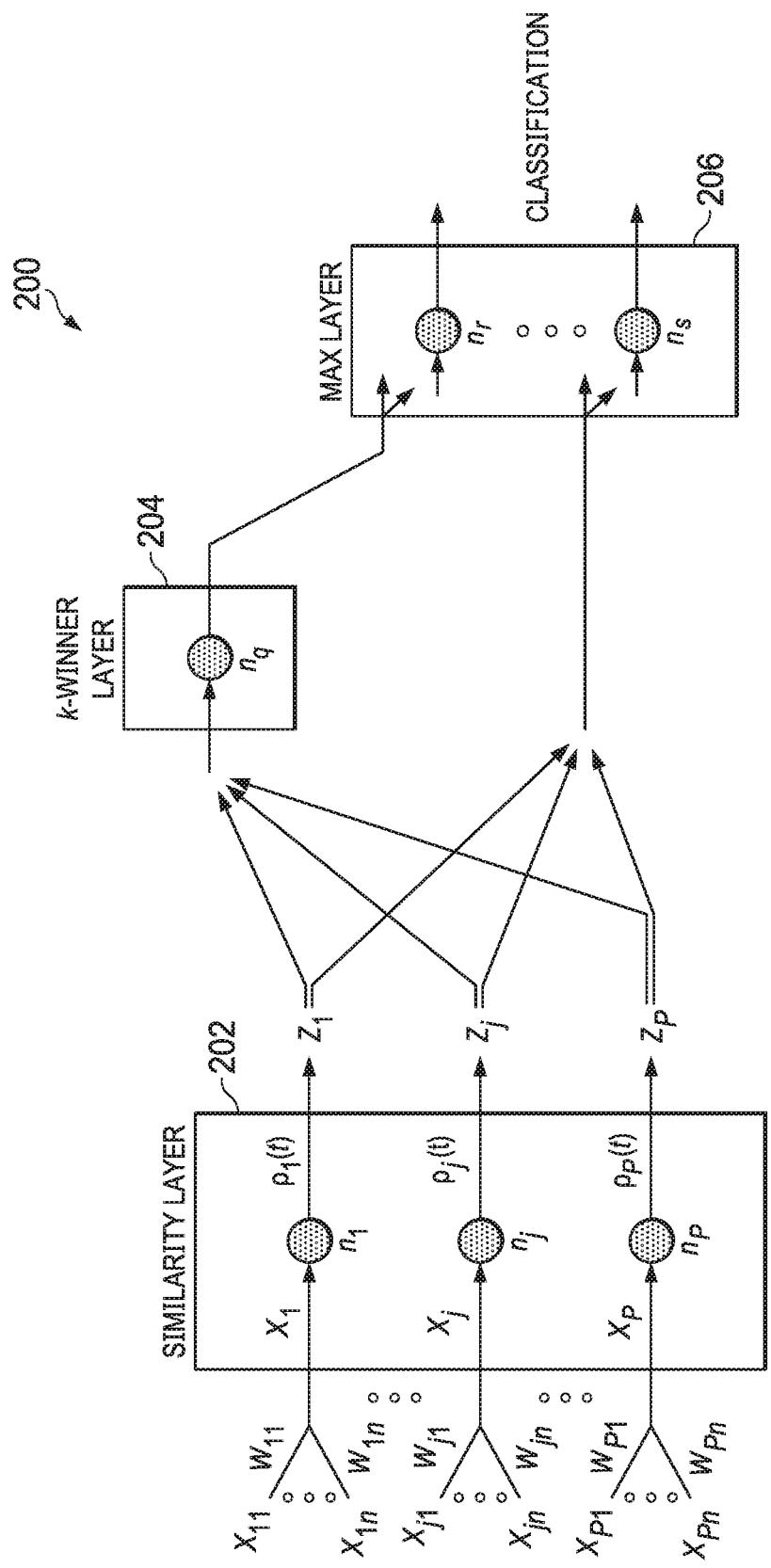
FIG. 2 illustrates a spiking nearest neighbor neural circuit, in accordance with an illustrative embodiment.

FIG. 2 illustrates a spiking nearest neighbor neural circuit, in accordance with an illustrative embodiment. Circuit 200, a spiking nearest neighbor neural circuit, may be implemented either as software or as an application-specific integrated circuit.

The classic k-nearest neighbor algorithm is a nonparametric machine learning algorithm which determines class membership as the class of the majority of the k nearest data points. This machine learning algorithm may be implemented using spiking neurons as a spiking-nearest neighbor (s-NN) computation by having each neuron correspond to a data point and to perform a spiking similarity function and identifying the first k spike responses. The first k spikes correspond to the k most similar data points to the uncategorized query point.

A neural circuit spiking module for this algorithm is shown in FIG. 2. Similarity layer 202, which is similar to circuit 100 of FIG. 1, is initially used. The k-winner layer 204 determines when the k nearest neighbors have been found and then primes max layer 206, which determines the class of the majority of the k winning nearest neighbors.

As a supervised problem, the classes attributed to the distribution data are known and in addition to serving as input to the k neighbor counter also increments neurons corresponding to the individual classes in max layer 206. Max layer 206 then feeds each class neuron unit inputs until the majority class fires yielding the classification.

Figure 3:
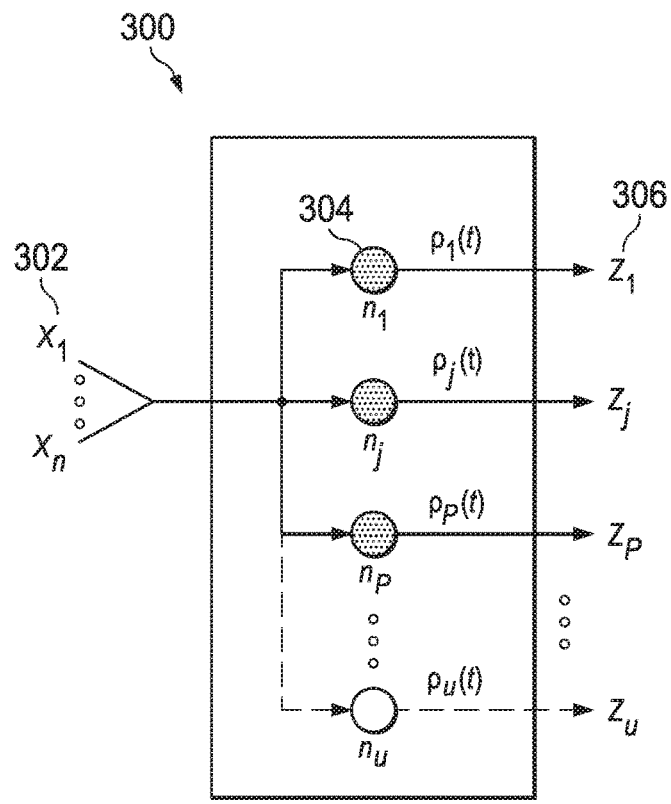
FIG. 3 illustrates a spiking adaptive resonance theory neural circuit, in accordance with an illustrative embodiment.

FIG. 3 illustrates a spiking adaptive resonance theory neural circuit, in accordance with an illustrative embodiment. Circuit 300, a spiking adaptive resonance theory neural circuit, may be implemented either as software or as an application-specific integrated circuit.

Adaptive resonance theory (ART) is an online learning family of classifiers originally developed by Carpenter and Grossberg and extended by many other researchers. While several variants have been explored focusing upon concepts such as the impact of weight precision and training convergence, the core ART algorithm is to assess inputs in comparison against stored templates to determine if a sufficiently similar representation (defined by a vigilance parameter) exists or if a new category needs to be learned. This core computation is performed through resonance as the measure of whether learning and adaptation need to occur.

A spiking-ART version may be implemented by first performing spiking similarity to determine the closest matching template. The vigilance similarity comparison constraint may be directly incorporated by only allowing a temporal response within p time steps. If a sufficient match is found weights of the winning neuron are updated accordingly. Otherwise a new uncommitted neuron is added with weights set to the present input. A neural circuit spiking module for this algorithm is shown in FIG. 3. Inputs 302 are passed through neurons 304 to produce outputs 306, in the manner shown in FIG. 3.

Figure 4:
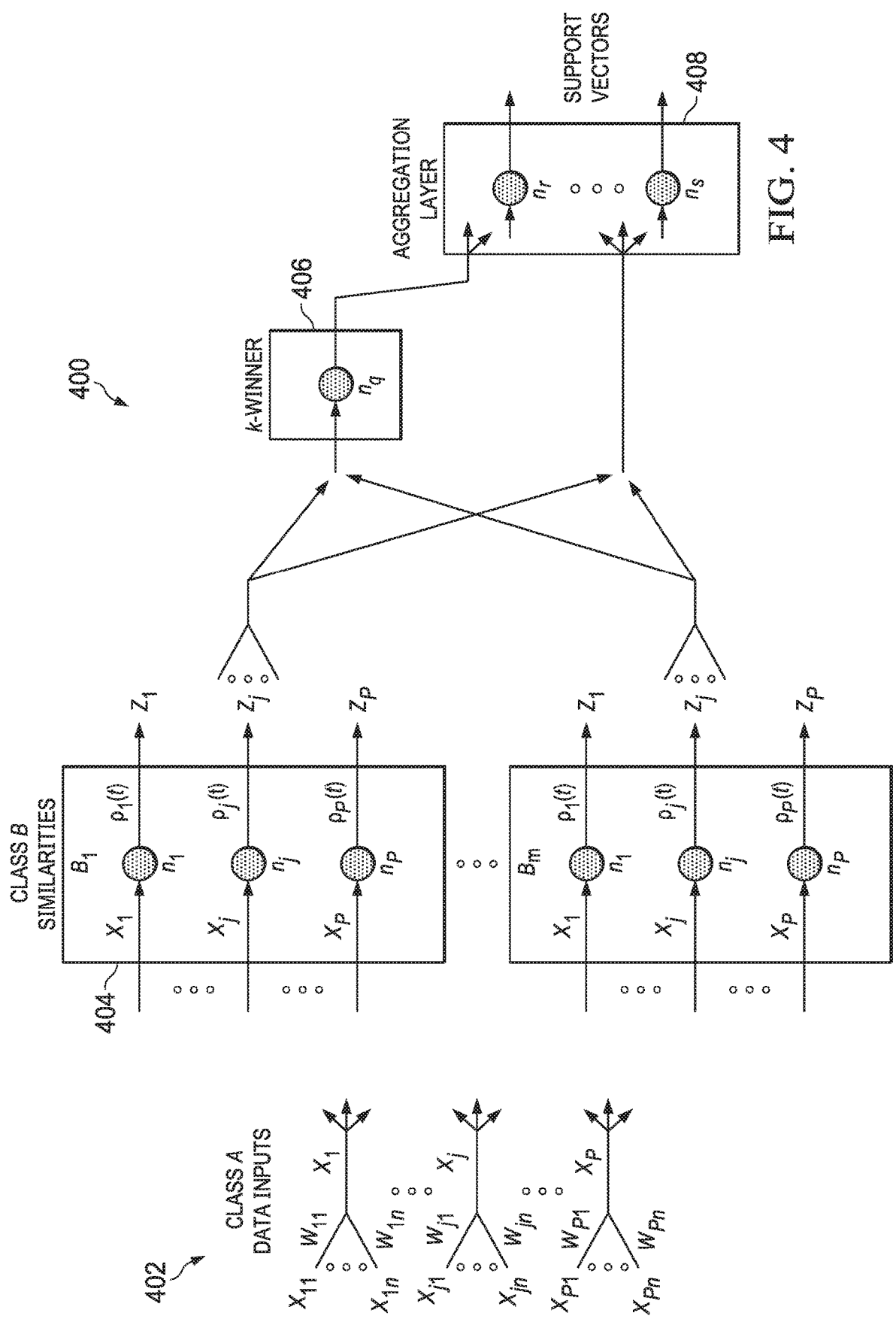
FIG. 4 illustrates a spiking support vector machine neural circuit, in accordance with an illustrative embodiment.

FIG. 4 illustrates a spiking support vector machine neural circuit, in accordance with an illustrative embodiment. Circuit 100, a spiking support vector machine neural circuit, may be implemented either as software or as an application-specific integrated circuit.

The canonical support vector machine (SVM) algorithm is a machine learning algorithm in which a quadratic optimization problem is solved to identify the namesake support vectors. These data points define the curvature and placement of the discriminant decision boundary. The SVM algorithm may be equivalently cast as a game theoretic interaction in which data points compete to elucidate the support vectors based upon proximity to opposing classes. Effectively, the game theoretic instantiation consists of sorted distance computations and set membership count.

These computations may be implemented by spiking neural circuits as shown in FIG. 4. As shown, first, class A data inputs 402 are provided to a similarity module, which is used to determine the distance of a data point to all data points of the opposing class. A similarity module, such as similarity module 404, is dedicated to each point of the class. These similarities are computed in parallel and the overarching computation may terminate early as only the maximally similar point is desired (the closest point to the opposing class). Each of these emerging points (one for each point in the class) then primes a subsequent accumulation layer which aggregates the set of closest points.

A k-winner accumulator 406 determines when all of the individual similarity circuits have finished and primes the aggregation layer 408 to read out the support vectors. This neural circuit may be duplicated to likewise determine the support vectors for the opposing class.

In the case of a linearly separable problem, a single support vector will remain. Otherwise, having multiple support vectors is indicative of a nonlinear solution. As is the case with the classic SVM approach, non-separable and nonlinear problems may necessitate other pre-processing such as a kernel space transformation before instantiating the fundamental SVM calculation. These challenges may be addressed, for example, by a non-linear kernel projection by providing an appropriate input weight mapping.

CONCLUSIONS

We have presented spiking neural circuit implementations of several fundamental machine learning algorithms. These implementations are built upon utilizing spiking neurons to perform a similarity computation. Not only do such measures allow for spiking neural implementations to be compared against classic or ideal theoretical algorithms, but additionally provide insight into requirements for neuromorphic hardware implementations. In many cases, neuromorphic hardware is only utilized for the inference portion of a deep neural network, leaving the computationally intensive training/learning process to be performed on costlier hardware.

This effort shows how spiking neural computation may be utilized to perform learning as well as inference, and in doing so provides a path towards performing learning computation in low power neuromorphic hardware. This approach may be extended for a spiking neural computation implementation of many other machine learning algorithms as well. Furthermore, these spiking machine learning algorithms are enabled by fundamental sub-computations such as distances and optimizations; similarly, many other algorithms besides machine learning may also be executed by spiking neural circuits and likewise take advantage of emerging neuromorphic hardware.

Figure 5:
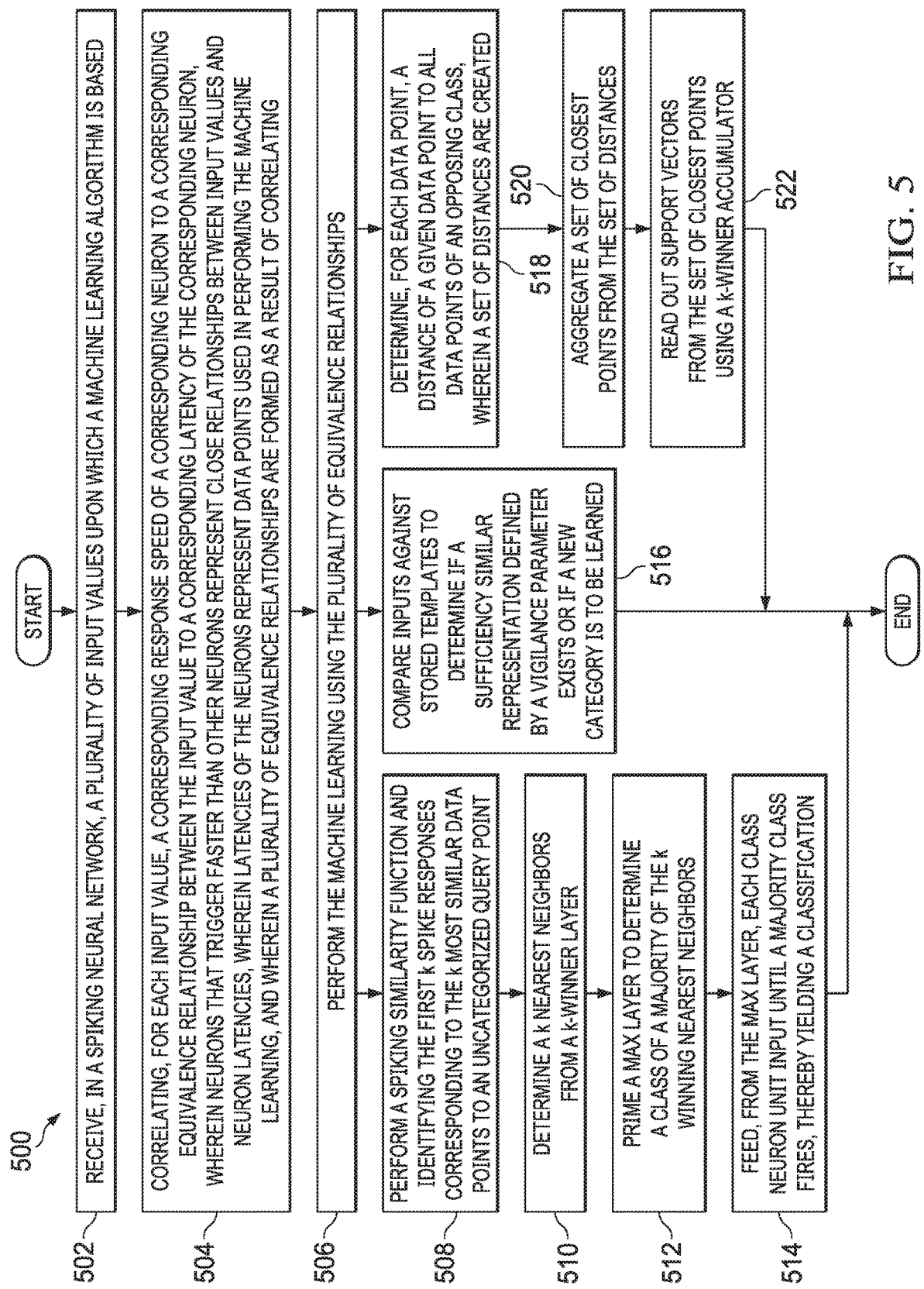
FIG. 5 illustrates a flowchart of a method for increasing the speed and efficiency of a computer when performing machine learning using spiking neural networks, in accordance with an illustrative embodiment.

FIG. 5 illustrates a flowchart of a method for increasing the speed and efficiency of a computer when performing machine learning using spiking neural networks, in accordance with an illustrative embodiment. Method 500 may be implemented as software executed by a computer, or may be implemented as an application specific integrated circuit (ASIC).

Method 500 has the technical effect of increasing the speed of a computer performing machine learning, the power efficiency of performing machine learning, or both. By "power efficiency" the illustrative embodiments refer to physical electric power; that is, a primary technical effect of the illustrative embodiments is to reduce the electrical energy needed to perform the desired calculations on a physical computer. Increasing power efficiency is important in scientific computing, as increased energy consumption leads to heating physical hardware components. In turn, heating can reduce hardware efficiency and, in some cases, can degrade or damage computing hardware. Therefore, another technical effect of the illustrative embodiments is to allow a computer to perform the desired calculations without causing undesirable heating or undesirable energy consumption. Another primary technical effect of the illustrative embodiments is to increase the speed at which a computer can calculate the desired machine learning by increasing the efficiency at which computing can take place. Thus, effectively, the neuromorphic algorithms of the illustrative embodiments, including that shown in FIG. 5, improve both the speed of a computer with respect to the desired calculations, as well as hardware power usage.

Scientific computing is one example domain. Other domains include computing in resource constrained environments such as edge devices (battery powered devices like cell phones for example), performing computation at sensors, data centers, anywhere with machine intelligence, etc. Related to the above point about expanding the potential application areas, in addition to heat induced damage, the reduction in power necessary to perform computation is a compelling application driver. Anything with a limited power budget is resource constrained (size, weight, and power limited), and even big data centers are seeking reduced power as they strive to scale towards larger computation.

Returning to method 500, this method may be characterized as a method for increasing the speed and efficiency of a computer when performing machine learning using spiking neural networks. Method 500 includes receiving, in a spiking neural network, a plurality of input values upon which a machine learning algorithm is based (operation 502). Method 500 also includes correlating, for each input value, a corresponding response speed of a corresponding neuron to a corresponding equivalence relationship between the input value to a corresponding latency of the corresponding neuron, wherein neurons that trigger faster than other neurons represent close relationships between input values and neuron latencies, wherein latencies of the neurons represent data points used in performing the machine learning, and wherein a plurality of equivalence relationships are formed as a result of correlating (operation 504). Method 500 also includes performing the machine learning using the plurality of equivalence relationships (operation 506). In one illustrative embodiment, the method may terminate thereafter.

Method 500 may be varied. For example, the machine learning may be a k-nearest neighbor algorithm. In this case, method 500 also includes performing a spiking similarity function and identifying the first k spike responses corresponding to the k most similar data points to an uncategorized query point (operation 508). In this case, method 500 also includes determining a k nearest neighbors from a k-winner layer (operation 510); and priming a max layer to determine a class of a majority of the k winning nearest neighbors (operation 512). In addition, method 500 may also include feeding, from the max layer, each class neuron unit input until a majority class fires, thereby yielding a classification (operation 514). In one illustrative embodiment, the method may terminate thereafter.

As an alternative extension to operations 502, 504, and 506, method 500 may also be applied to an adaptive resonance theory learning classifier. In this case, method 500 also includes comparing inputs against stored templates to determine if a sufficiency similar representation defined by a vigilance parameter exists or if a new category is to be learned (operation 516). In one illustrative embodiment, the method may terminate thereafter.

As an alternative extension to operations 502, 504, and 506, method 500 may also be applied to a support vector machine. In this case, method 500 also includes determining, for each data point, a distance of a given data point to all data points of an opposing class, wherein a set of distances are created (operation 518). In this case, method 500 also may include aggregating a set of closest points from the set of distances (operation 520). Further, method 500 also may include reading out support vectors from the set of closest points using a k-winner accumulator (operation 522). In one illustrative embodiment, the method may terminate thereafter.

The illustrative embodiments also contemplate a computer which is configured to execute the above method, such as but not limited to an application specific integrated circuit (ASIC). The illustrative embodiments also contemplate a non-transitory computer readable storage medium storing program code which, when executed by a processor, performs the above computer-implemented method.

Figure 6:
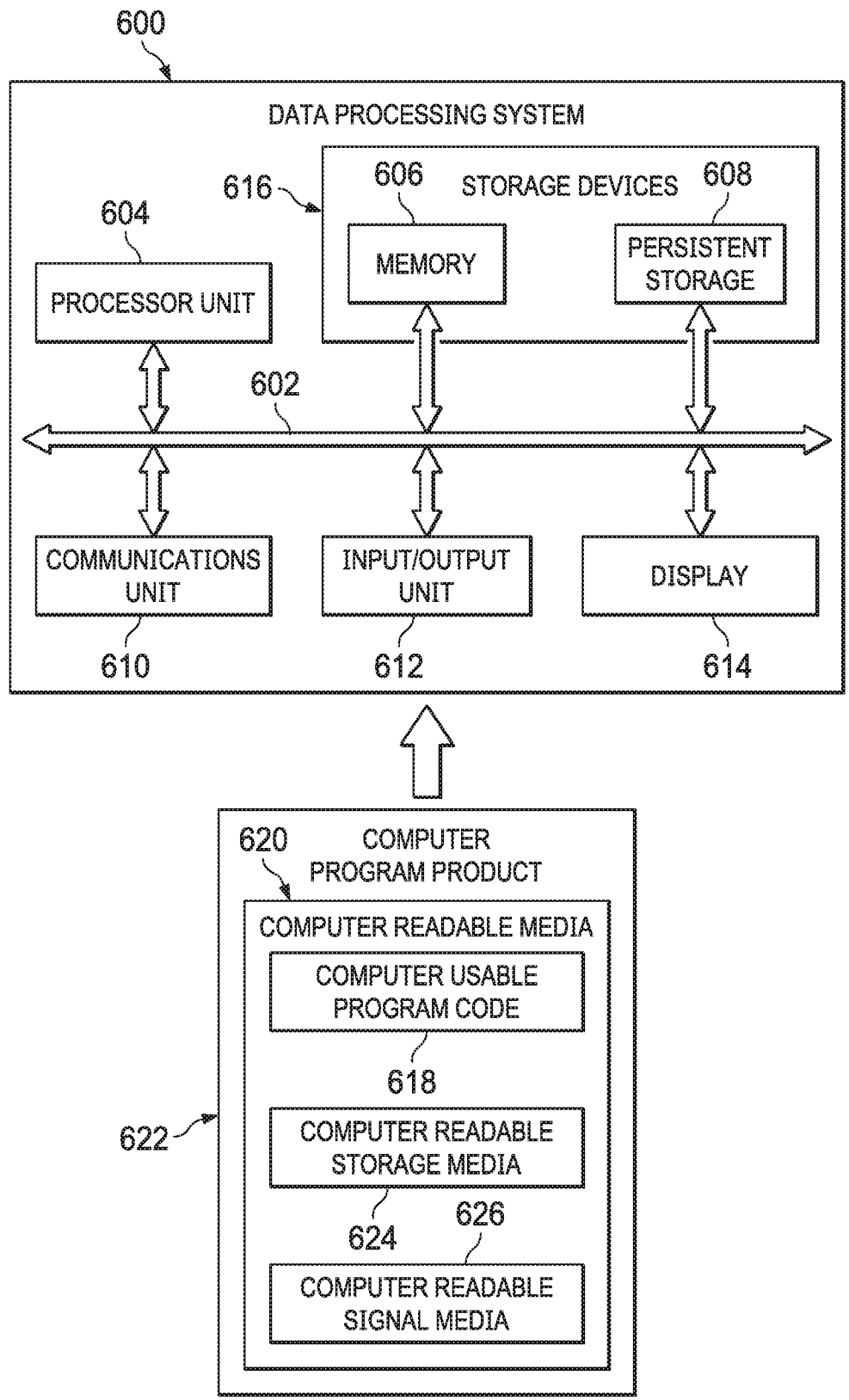
FIG. 6 illustrates a data processing system, in accordance with an illustrative embodiment.

Turning now to FIG. 6, an illustration of a data processing system is depicted in accordance with an illustrative embodiment. Data processing system 600 in FIG. 6 is an example of a data processing system that may be used to implement the illustrative embodiments, such those described with respect to FIG. 2 through FIG. 5. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. This software may be a content addressable memory, or software for implementing the processes described elsewhere herein. Thus, for example, software loaded into memory 606 may be software for executing the methods described with respect to FIG. 2 through FIG. 5. Processor unit 604 may be a number of processors, a multi-processor core, or some other type of processor, depending on the particular implementation.

It is also specifically contemplated to implement the illustrative embodiments on neuromorphic hardware. In other words, the illustrative embodiments may be embodied on a computer which specifically has a computer-neuron architecture.

A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Computer usable program code 618 is located in a functional form on computer readable media 620 that is selectively removable and may be loaded onto or transferred to data processing system 600 for execution by processor unit 604. Computer usable program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, computer usable program code 618 may be transferred to data processing system 600 using computer readable signal media 626. Computer readable signal media 626 may be, for example, a propagated data signal containing computer useable program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer usable program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing computer useable program code 618 may be a server computer, a client computer, or some other device capable of storing and transmitting computer useable program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, a programmable logic array, programmable array logic, a field programmable logic array, a field programmable gate array, and other suitable hardware devices. With this type of implementation, computer useable program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run computer usable program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The different illustrative embodiments can take the form of an entirely hardware embodiment, an entirely software embodiment, or an embodiment containing both hardware and software elements. Some embodiments are implemented in software, which includes but is not limited to forms such as, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for increasing a speed and efficiency of a computer when performing machine learning using spiking neural networks, the method comprising computer-implemented operations of:
   receiving, in a spiking neural network, a plurality of input values upon which a machine learning algorithm is based;
   correlating, for each input value, a corresponding response speed of a corresponding neuron to a corresponding equivalence relationship between the input value to a corresponding latency of the corresponding neuron, wherein neurons that trigger faster than other neurons represent close relationships between input values and neuron latencies, wherein latencies of the neurons represent data points used in performing the machine learning, and wherein a plurality of equivalence relationships are formed as a result of correlating; and
   performing the machine learning using the plurality of equivalence relationships.

2. The method of claim 1 wherein the machine learning comprises a k-nearest neighbor algorithm.

3. The method of claim 2 further comprising:
   performing a spiking similarity function and identifying the first k spike responses corresponding to the k most similar data points to an uncategorized query point.

4. The method of claim 3 further comprising:
   determining a k nearest neighbors from a k-winner layer; and
   priming a max layer to determine a class of a majority of the k winning nearest neighbors.

5. The method of claim 4 further comprising:
   feeding, from the max layer, each class neuron unit input until a majority class fires, thereby yielding a classification.

6. The method of claim 1 wherein the machine learning comprises an adaptive resonance theory learning classifier.

7. The method of claim 6 further comprising:
   comparing inputs against stored templates to determine if a sufficiency similar representation defined by a vigilance parameter exists or if a new category is to be learned.

8. The method of claim 1 wherein the machine learning comprises a support vector machine.

9. The method of claim 8 further comprising:
   determining, for each data point, a distance of a given data point to all data points of an opposing class, wherein a set of distances are created;
   aggregating a set of closest points from the set of distances; and
   reading out support vectors from the set of closest points using a k-winner accumulator.

10. A non-transitory computer readable storage medium storing program code which, when executed by a processor, performs a computer-implemented method for increasing a speed and efficiency of a computer when performing machine learning using spiking neural networks, the program code comprising:
    computer usable program code for receiving, in a spiking neural network, a plurality of input values upon which a machine learning algorithm is based;
    computer usable program code for correlating, for each input value, a corresponding response speed of a corresponding neuron to a corresponding equivalence relationship between the input value to a corresponding latency of the corresponding neuron, wherein neurons that trigger faster than other neurons represent close relationships between input values and neuron latencies, wherein latencies of the neurons represent data points used in performing the machine learning, and wherein a plurality of equivalence relationships are formed as a result of correlating; and
    computer usable program code for performing the machine learning using the plurality of equivalence relationships.

11. The non-transitory computer readable storage medium of claim 10 wherein the machine learning comprises a k-nearest neighbor algorithm.

12. The non-transitory computer readable storage medium of claim 11 wherein the program code further comprises:
    computer usable program code for performing a spiking similarity function and identifying the first k spike responses corresponding to the k most similar data points to an uncategorized query point;
    computer usable program code for determining a k nearest neighbors from a k-winner layer;
    computer usable program code for priming a max layer to determine a class of a majority of the k winning nearest neighbors; and
    computer usable program code for feeding, from the max layer, each class neuron unit input until a majority class fires, thereby yielding a classification.

13. The non-transitory computer readable storage medium of claim 10 wherein the machine learning comprises an adaptive resonance theory learning classifier, and wherein the program code further comprises:
    computer usable program code for comparing inputs against stored templates to determine if a sufficiency similar representation defined by a vigilance parameter exists or if a new category is to be learned.

14. The non-transitory computer readable storage medium of claim 10 wherein the machine learning comprises a support vector machine, and wherein the program code further comprises:
    program code for determining, for each data point, a distance of a given data point to all data points of an opposing class, wherein a set of distances are created;
    program code for aggregating a set of closest points from the set of distances; and
    program code for reading out support vectors from the set of closest points using a k-winner accumulator.

15. A computer comprising:
a processor; and
a non-transitory computer readable storage medium in communication with the processor and storing program code which, when executed by the processor, performs a computer-implemented method for increasing a speed and efficiency of a computer when performing machine learning using spiking neural networks, the program code comprising:
computer usable program code for receiving, in a spiking neural network, a plurality of input values upon which a machine learning algorithm is based;
computer usable program code for correlating, for each input value, a corresponding response speed of a corresponding neuron to a corresponding equivalence relationship between the input value to a corresponding latency of the corresponding neuron, wherein neurons that trigger faster than other neurons represent close relationships between input values and neuron latencies, wherein latencies of the neurons represent data points used in performing the machine learning, and wherein a plurality of equivalence relationships are formed as a result of correlating; and
computer usable program code for performing the machine learning using the plurality of equivalence relationships.

16. The computer of claim 15 wherein the machine learning comprises a k-nearest neighbor algorithm and wherein the program code further comprises:
computer usable program code for performing a spiking similarity function and identifying the first k spike responses corresponding to the k most similar data points to an uncategorized query point;
computer usable program code for determining a k nearest neighbors from a k-winner layer;
computer usable program code for priming a max layer to determine a class of a majority of the k winning nearest neighbors; and
computer usable program code for feeding, from the max layer, each class neuron unit input until a majority class fires, thereby yielding a classification.

17. The computer of claim 15 wherein the machine learning comprises an adaptive resonance theory learning classifier.

18. The computer of claim 17 wherein the program code further comprises:
computer usable program code for comparing inputs against stored templates to determine if a sufficiency similar representation defined by a vigilance parameter exists or if a new category is to be learned.

19. The computer of claim 15 wherein the machine learning comprises a support vector machine.

20. The computer of claim 19 wherein the program code further comprises:
program code for determining, for each data point, a distance of a given data point to all data points of an opposing class, wherein a set of distances are created;
program code for aggregating a set of closest points from the set of distances; and
program code for reading out support vectors from the set of closest points using a k-winner accumulator.

* * * * *